US012663505B2

(12) United States Patent
Arkind et al.

(10) Patent No.: US 12,663,505 B2
(45) Date of Patent: Jun. 23, 2026

(54) EXTENDED VIRTUAL ARRAY IN AN AUTOMOTIVE MIMO RADAR

(71) Applicant: Arbe Robotics Ltd., Tel Aviv (IL)

(72) Inventors: Noam Arkind, Givatayim (IL); Ram Machness, Plano, TX (US)

(73) Assignee: Arbe Robotics Ltd. (IL)

( * ) Notice: Subject to any disclaimer, the term of this patent is extended or adjusted under 35 U.S.C. 154(b) by 240 days.

(21) Appl. No.: 18/701,615

(22) PCT Filed: Dec. 21, 2022

(86) PCT No.: PCT/IL2022/051368
§ 371 (c)(1),
(2) Date: Apr. 16, 2024

(87) PCT Pub. No.: WO2023/131941
PCT Pub. Date: Jul. 13, 2023

(65) Prior Publication Data
US 2025/0231274 A1      Jul. 17, 2025

(30) Foreign Application Priority Data
Jan. 6, 2022      (IL) .......................................... 289661

(51) Int. Cl.
*G01S 7/03* (2006.01)
*G01S 7/40* (2006.01)
*H01Q 1/32* (2006.01)

(52) U.S. Cl.
CPC *G01S 7/03* (2013.01); *G01S 7/40* (2013.01); *H01Q 1/3233* (2013.01)

(58) Field of Classification Search
CPC ............................ G01S 13/931; H01Q 1/3233
See application file for complete search history.

(56) References Cited

U.S. PATENT DOCUMENTS 11,677,159 B2 * 6/2023 Zhu ........................ H01Q 21/28
342/25 A
2010/0026578 A1 2/2010 Furnanz
(Continued)

FOREIGN PATENT DOCUMENTS

DE          10144403 A1      7/2003
EP          3499264 B1      7/2020
(Continued)

*Primary Examiner* — Vladimir Magloire
*Assistant Examiner* — Eric K Hodac
(74) *Attorney, Agent, or Firm* — Zaretsky Group PC; Howard Zaretsky

(57)          ABSTRACT
A novel and useful system and method for extending the virtual array of an existing MIMO automotive radar. In one embodiment, the virtual array is extended by adding one or more additional TX or RX antennas to the existing radar thereby improving the resolution in either azimuth or elevation or both. The additional antennas are added via one or more extender printed circuit boards (PCBs) that are connected to the main radar PCB. The one or more extender PCBs include the additional TX or RX antenna arrays and are adapted to be a set fixed distance in orientation from the main PCB in accordance with the desired virtual array. The one or more extender PCBs and main PCB are mounted in housings that are rigidly mechanically connected to each other. The local oscillator (LO) signal generated on the main PCB is fed to the one or more extender PCBs via any suitable signal connection including RF, electrical, or waveguide connections.

19 Claims, 10 Drawing Sheets

(56)                    References Cited

U.S. PATENT DOCUMENTS

| | | | |
|---|---|---|---|
| 2011/0181459 A1* | 7/2011 | Feger | G01S 3/465 |
| | | | 342/146 |
| 2015/0241546 A1* | 8/2015 | Boyle | G06F 18/2413 |
| | | | 342/359 |
| 2018/0149736 A1 | 5/2018 | Alland | |
| 2018/0151958 A1 | 5/2018 | Lim | |
| 2018/0159246 A1 | 6/2018 | Raphaeli | |
| 2019/0049577 A1 | 2/2019 | Iida | |
| 2019/0195986 A1* | 6/2019 | Hellinger | H01Q 1/3233 |
| 2019/0324136 A1 | 10/2019 | Amadjikpe | |
| 2019/0377814 A1 | 12/2019 | Shtrom | |
| 2020/0003884 A1 | 1/2020 | Arkind | |
| 2020/0301002 A1 | 9/2020 | Wu | |
| 2021/0025972 A1 | 1/2021 | Loesch | |
| 2021/0156984 A1 | 5/2021 | Campbell | |
| 2021/0215817 A1 | 7/2021 | Lee | |
| 2021/0349201 A1 | 11/2021 | Trummer | |
| 2023/0231615 A1* | 7/2023 | Elad | H04B 1/0082 |
| | | | 375/262 |
| 2024/0243477 A1* | 7/2024 | Alpman | H01Q 9/0414 |

FOREIGN PATENT DOCUMENTS

| | | | |
|---|---|---|---|
| EP | 4050364 A1 | 8/2022 | |
| WO | 2022/165002 A1 | 8/2022 | |

* cited by examiner

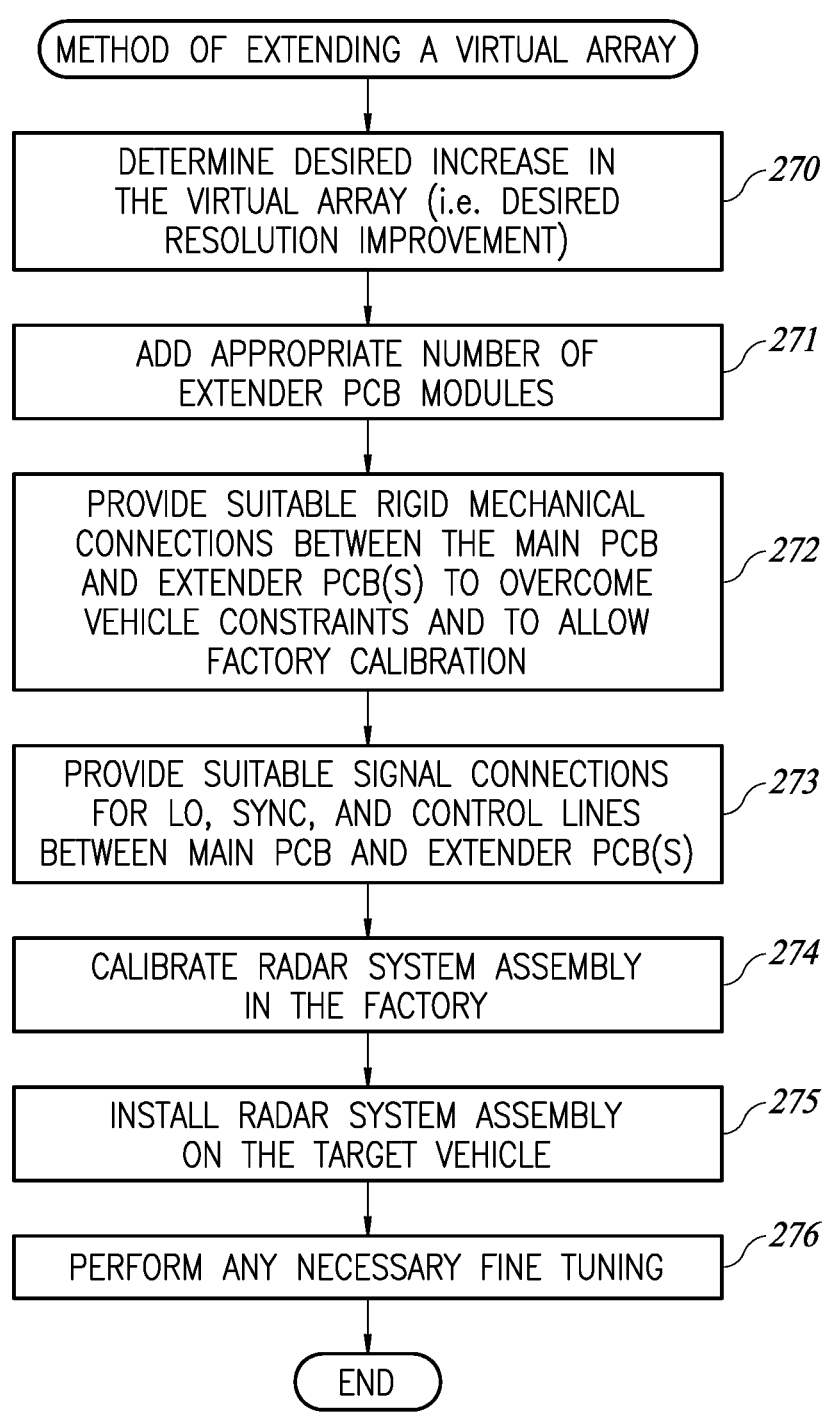

METHOD OF EXTENDING A VIRTUAL ARRAY

DETERMINE DESIRED INCREASE IN THE VIRTUAL ARRAY (i.e. DESIRED RESOLUTION IMPROVEMENT)  /270

ADD APPROPRIATE NUMBER OF EXTENDER PCB MODULES  /271

PROVIDE SUITABLE RIGID MECHANICAL CONNECTIONS BETWEEN THE MAIN PCB AND EXTENDER PCB(S) TO OVERCOME VEHICLE CONSTRAINTS AND TO ALLOW FACTORY CALIBRATION  /272

PROVIDE SUITABLE SIGNAL CONNECTIONS FOR LO, SYNC, AND CONTROL LINES BETWEEN MAIN PCB AND EXTENDER PCB(S)  /273

CALIBRATE RADAR SYSTEM ASSEMBLY IN THE FACTORY  /274

INSTALL RADAR SYSTEM ASSEMBLY ON THE TARGET VEHICLE  /275

PERFORM ANY NECESSARY FINE TUNING  /276

END

FIG. 14

EXTENDED VIRTUAL ARRAY IN AN AUTOMOTIVE MIMO RADAR

FIELD OF THE DISCLOSURE

The subject matter disclosed herein relates to the field of imaging radar, sonar, ultrasound, and other sensors for performing range measurement via FMCW signals and/or angle measurement via digital beam forming and array processing and more particularly relates to a system and method of extending the virtual array in an automotive multiple-output multiple-input (MIMO) radar.

BACKGROUND OF THE INVENTION

In recent years many industries are moving to autonomous solutions such as the automotive industry, deliveries etc. These autonomous platforms should operate in the environment while interacting with both the stationary and moving objects. For this purpose, these systems require a sensor suite which allows them to sense their surrounding in a reliable and efficient manner. For example, in order for an autonomous car to plan its route on a road with other cars on it, the trajectory planner must have a 3D map of the environment with indication of moving objects.

Visual sensors are also degraded by bad weather and poor visibility due to fog, smoke, sand, storms, etc.). They are also limited in estimating radial velocities. Light Detection And Ranging (LIDAR) devices are used to measure distance to a target by illuminating that target with a laser light. These devices, however, are expensive, have moving parts, and have very limited range. Radar is an augmenting and not a replacing technology.

Due to natural limitations of visual sensors in range accuracy and reliability problems with optical (e.g., laser) technologies, the best solution to generate this 3D map is via a radar technology. This imposes a new set of requirements which modern radars do not comply with.

Generally, the larger the aperture of the receiving antenna, the more radiation is received which results in higher sensitivity, or equivalently, a narrower main lobe. Hence, the receiving antenna can receive weaker signals and provide a relatively accurate indication regarding their direction.

On the other hand, vehicular radars, including automotive imaging radars, typically have smaller apertures. Although automotive radars transmit relatively weak signals since they are limited by power consumption and regulation, depending on the link-budget, they may require less sensitivity since the range is relatively short and the signals that are reflected from a target are relatively strong. Vehicular radars, however, are not required to detect point targets, such as an aircraft detected by a missile, but do require high accuracy in order to provide an image of the environment information which is used an input to one or more tracking and post-processing algorithms and/or a Simultaneous Localization And Mapping (SLAM) algorithm which detects the location of obstacles such as other cars or pedestrians in close vicinity to generate an object list from the raw radar detections. A narrow lobe with high accuracy will be able to provide sharper contour lines of the target image. The lobe width is determined solely by the equivalent aperture, normalized to the wavelength of the transmitted radar signal and not by the number of receiving antenna elements within the aperture, which affects the sensitivity, i.e. the ability to detect weak reflected signals, and ambiguity resolution and the side lobes level.

Another critical performance parameter of imaging radars is the side lobe levels of the antenna array. The side lobes reflected off strong targets may mask weak targets or cause false detections. For example, a large object such as a wall located in the direction of a side lobe causes reflections from the wall to appear in the main lobe. This will mask reflections that originate from an obstacle, such as a pedestrian, or create a phantom obstacle which may cause the vehicle to stop.

Therefore, in automotive imaging radars, it is critical to reduce side lobes as much as possible. In addition, there is a need for a compact radar switch array antenna having high azimuth and elevation angular resolution and accuracy that provides increased effective aperture, while using a low number of transmit (TX) and receive (RX) elements that meets cost, space, power and reliability requirements.

Recently, applications of radars in the automotive industry have started to emerge. High-end automobiles already have radars that provide parking assistance and lane departure warning to the driver. Currently, there is growing interest in self-driving cars and it is currently considered to be the main driving force in the automotive industry in the coming years.

Self-driving cars offer a new perspective on the application of radar technology in automobiles. Instead of only assisting the driver, automotive radars will be capable of taking an active role in the control of the vehicle. They are thus likely to become a key sensor of the autonomous control system of a vehicle.

Radar is preferred over other alternatives such as sonar or LIDAR as it is less affected by weather conditions and can be made very small to decrease the effect of the deployed sensor on the aerodynamics and appearance of the vehicle. Frequency Modulated Continuous Wave (FMCW) radar is a type of radar that offers several advantages compared to the others. For example, it ensures the range and velocity information of the surrounded objects can be detected simultaneously. This information is important for the control system of the self-driving vehicle to provide safe and collision-free operation.

For shorter range detection, as in automotive radar, FMCW radar is commonly used. Several benefits of FMCW radar in automotive applications include: (1) FMCW modulation is relatively easy to generate, provides large bandwidth, high average power, high accuracy, low cost due to low bandwidth processing and permits very good range resolution and allows the Doppler shift to be used to determine velocity, (2) FMCW radar can operate at short ranges with good performance, (3) FMCW sensors can be made small having a single RF transmission source with an oscillator that is also used to downconvert the received signal, (4) since the transmission is continuous, the modest output power of solid state components is sufficient.

A radar system installed in a car should be able to provide the information required by the control system in real-time. A baseband processing system is needed that is capable of providing enough computing power to meet real-time system requirements. The processing system performs digital signal processing on the received signal to extract the useful information such as range and velocity of the surrounded objects.

Currently, vehicles (especially cars) are increasingly equipped with technologies designed to assist the driver in critical situations. Besides cameras and ultrasonic sensors, car manufacturers are turning to radar as the cost of the associated technology decreases. The attraction of radar is that it provides fast and clear-cut measurement of the velocity and distance of multiple objects under any weather conditions. The relevant radar signals are frequency modulated and can be analyzed with spectrum analyzers. In this manner, developers of radar components can automatically detect, measure and display the signals in time and frequency domains, even up to frequencies of 500 GHz.

There is also much interest now in using radar in the realm of autonomous vehicles which is expected to become more prevalent in the future. Millimeter wave automotive radar is suitable for use in the prevention of collisions and for autonomous driving. Millimeter wave frequencies from 77 to 81 GHz are less susceptible to the interference of rain, fog, snow and other weather factors, dust and noise than ultrasonic radars and laser radars. These automotive radar systems typically comprise a high high frequency radar transmitter which transmits a radar signal in a known direction. The transmitter may transmit the radar signal in either a continuous or pulse mode. These systems also include a receiver connected to the appropriate antenna system which receives echoes or reflections from the transmitted radar signal. Each such reflection or echo represents an object illuminated by the transmitted radar signal.

Advanced driver assistance systems (ADAS) are systems developed to automate, adapt, and enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/ traffic warnings, connect to smartphones, alert driver to other cars or dangers, keep the driver in the correct lane, or show what is in blind spots.

There are many forms of ADAS available; some features are built into cars or are available as an add-on package. Also, there are aftermarket solutions available. ADAS relies on inputs from multiple data sources, including automotive imaging, LIDAR, radar, image processing, computer vision, and in-car networking. Additional inputs are possible from other sources external to the primary vehicle platform, such as other vehicles, referred to as vehicle-to-vehicle (V2V), or vehicle-to-infrastructure system (e.g., mobile telephony or Wi-Fi data network).

Advanced driver assistance systems are currently one of the fastest growing segments in automotive electronics, with steadily increasing rates of adoption of industry wide quality standards, in vehicular safety systems ISO 26262, developing technology specific standards, such as IEEE 2020 for image sensor quality and communications protocols such as the Vehicle Information API.

In recent years many industries are moving to autonomous solutions such as the automotive industry, deliveries, etc. These autonomous platforms operate in the environment while interacting with both stationary and moving objects. For this purpose, these systems require a sensor suite which allows them to sense their surroundings in a reliable and efficient manner. For example, in order for an autonomous vehicle to plan its route on a road with other vehicles on it, the trajectory planner must have a 3D map of the environment with an indication of the moving objects.

Visual sensors are also degraded by bad weather and poor visibility (e.g., fog, smoke, sand, rainstorms, snowstorms, etc.). They are also limited in estimating radial velocities. Light Detection and Ranging devices (LIDARs) are used to measure distance to a target by illuminating that target with a laser light. These, however, are expensive, as most have moving parts and very limited range. Thus, automotive radar is seen as an augmenting and not replacement technology.

In the automotive field, radar sensors are key components for comfort and safety functions, for example adaptive cruise control (ACC) or collision mitigation systems (CMS). With an increasing number of automotive radar sensors operated close to each other at the same time, radar sensors may receive signals from other radar sensors. The reception of foreign signals (interference) can lead to problems such as ghost targets or a reduced signal-to-noise ratio. Such an automotive interference scenario with direct interference from several surrounding vehicles is shown in FIG. 1.

A well-known way to reduce the number of antenna elements in an array is by using a MIMO technique known as 'virtual array', where separable (e.g., orthogonal) waveforms are transmitted from different antennas (usually simultaneously), and by means of digital processing a larger effective array is generated. The shape of this 'virtual array' is the special convolution of the transmission and reception antennas' positions.

It is also known that by means of bandpass sampling, the de-ramped signal can be sampled with lower A/D frequencies, while preserving the range information of the targets with the ranges matching the designed bandpass filter.

Achieving a high resolution simultaneously in the angular, range and doppler dimensions is a significant challenge due to (inter alia) a linear increment in hardware complexity resolution.

This challenge is particularly acute for existing automotive radars. It is desirable to have a mechanism that is able to extend the virtual array of existing radars thereby improving the resolution in either azimuth, elevation or both.

SUMMARY OF THE INVENTION

The present invention a system and method for extending the virtual array of an existing MIMO automotive radar. In one embodiment, the virtual array is extended by adding one or more additional TX or RX antennas to the existing radar thereby improving the resolution in either azimuth or elevation or both. The additional antennas are added via one or more extender printed circuit boards (PCBs) that are connected to the main radar PCB. The one or more extender PCBs include the additional TX or RX antenna arrays and are adapted to be a set fixed distance and orientation from the main PCB in accordance with the desired virtual array. The one or more extender PCBs and main PCB are mounted in housings that are rigidly mechanically connected to each other. The local oscillator (LO) signal generated on the main PCB is fed to the one or more extender PCBs via any suitable signal connection including RF, electrical, or waveguide connections.

There is thus provided in accordance with the invention, an apparatus for extending the virtual array of an automotive multiple-input multiple-output (MIMO) radar, comprising a main printed circuit board (PCB) incorporating a main RX antenna array and a main TX antenna array, one or more extender PCBs, each extender PCB located at a fixed distance from the main PCB and incorporating an extension TX antenna array without any additional RX antenna elements, the one or more extension TX antenna arrays operative to supplement the main TX antenna array to increase the resolution of the virtual array, one or more mechanical coupling members, each coupling member operative to rigidly mechanically connect the main PCB to one of the extender PCBs via respective housings, and one or more signal connections, each signal connection operative to couple a local oscillator (LO) signal generated on the main PCB to one of the extender PCBs.

There is also provided in accordance with the invention, a method of extending the virtual array of an automotive multiple-input multiple-output (MIMO) radar, the method comprising providing a main printed circuit board (PCB) incorporating a main RX antenna array and a main TX antenna array, providing one or more extender PCBs, each extender PCB located at a fixed distance from the main PCB and incorporating an extension TX antenna array without any additional RX antenna elements, each extension TX antenna array operative to supplement the main TX antenna array to increase the resolution of the virtual array, rigidly mechanically coupling each extender PCB to the main PCB via respective housings, and coupling a local oscillator (LO) signal generated on the main PCB to each extender PCB via a respective signal connection.

There is further provided in accordance with the invention, an apparatus for extending the virtual array of an automotive multiple-input multiple-output (MIMO) radar, comprising a main printed circuit board (PCB) incorporating a main RX antenna array and a main TX antenna array, a main housing for the main PCB, a pair of extender PCBs located on either side of and at a fixed distance from the main PCB, each extender PCB incorporating an extension TX antenna array without any additional RX antenna elements, the pair of extension TX antenna arrays operative to supplement the main TX antenna array to double the resolution of the virtual array, a pair of extender housings for the pair of extender PCBs, a mechanical coupling assembly operative to rigidly mechanically connect the main housing to the pair of extender housings, and signal connections operative to couple a local oscillator (LO) signal generated on the main PCB to the pair of extender PCBs.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. The invention is herein described, by way of example only, with reference to the accompanying drawings, wherein:

FIG. 14 is a flow diagram illustrating an example method of extending a virtual array.

DETAILED DESCRIPTION

Figure 1:
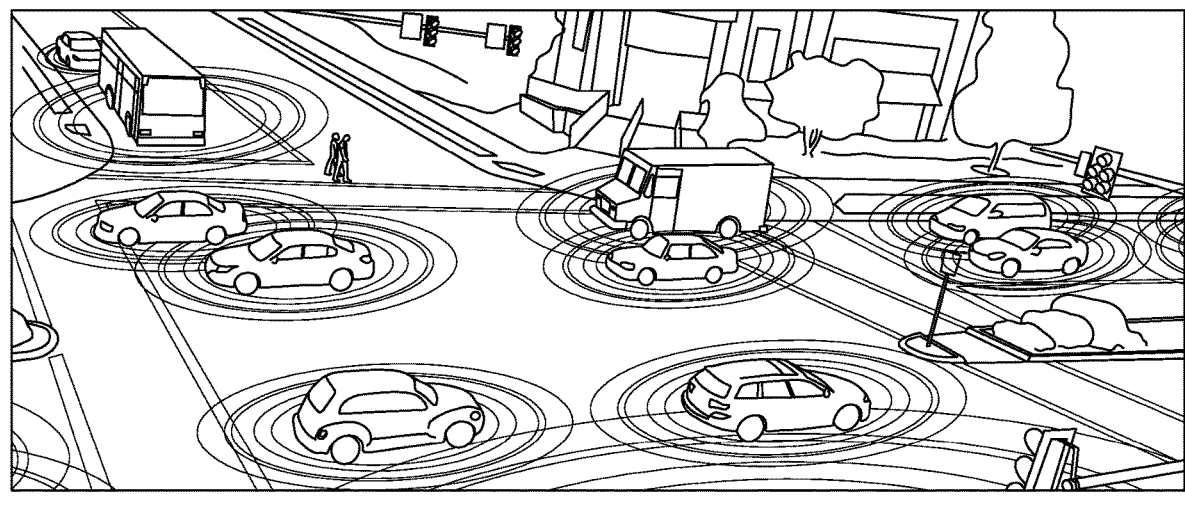
FIG. 1 is a diagram illustrating an example street scene incorporating several vehicles equipped with automotive radar sensor units.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein. It is to be understood, however, that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Figure 4:
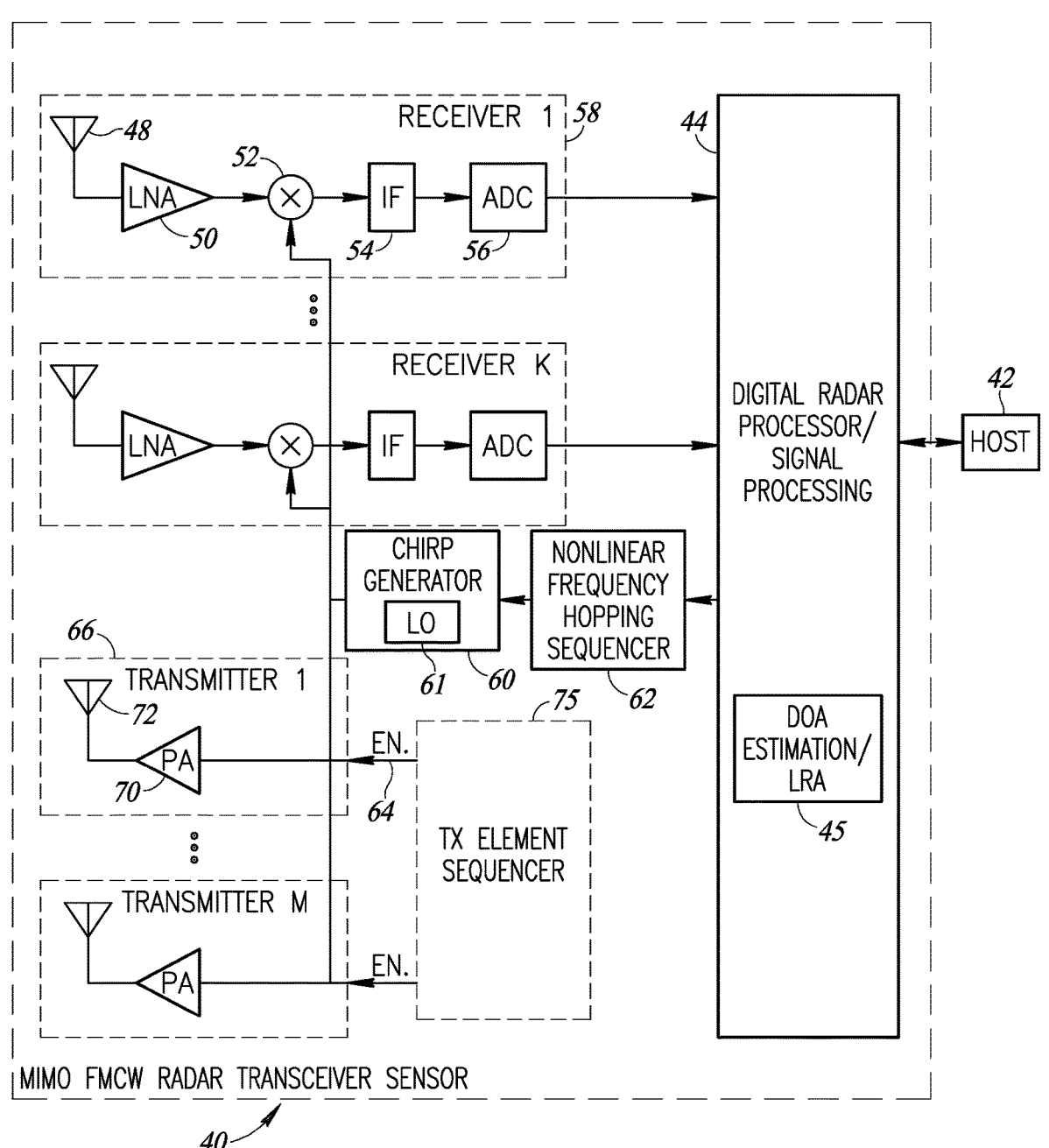
FIG. 4 is a high-level block diagram illustrating an example MIMO FMCW radar in accordance with the present invention.
Figure 5:
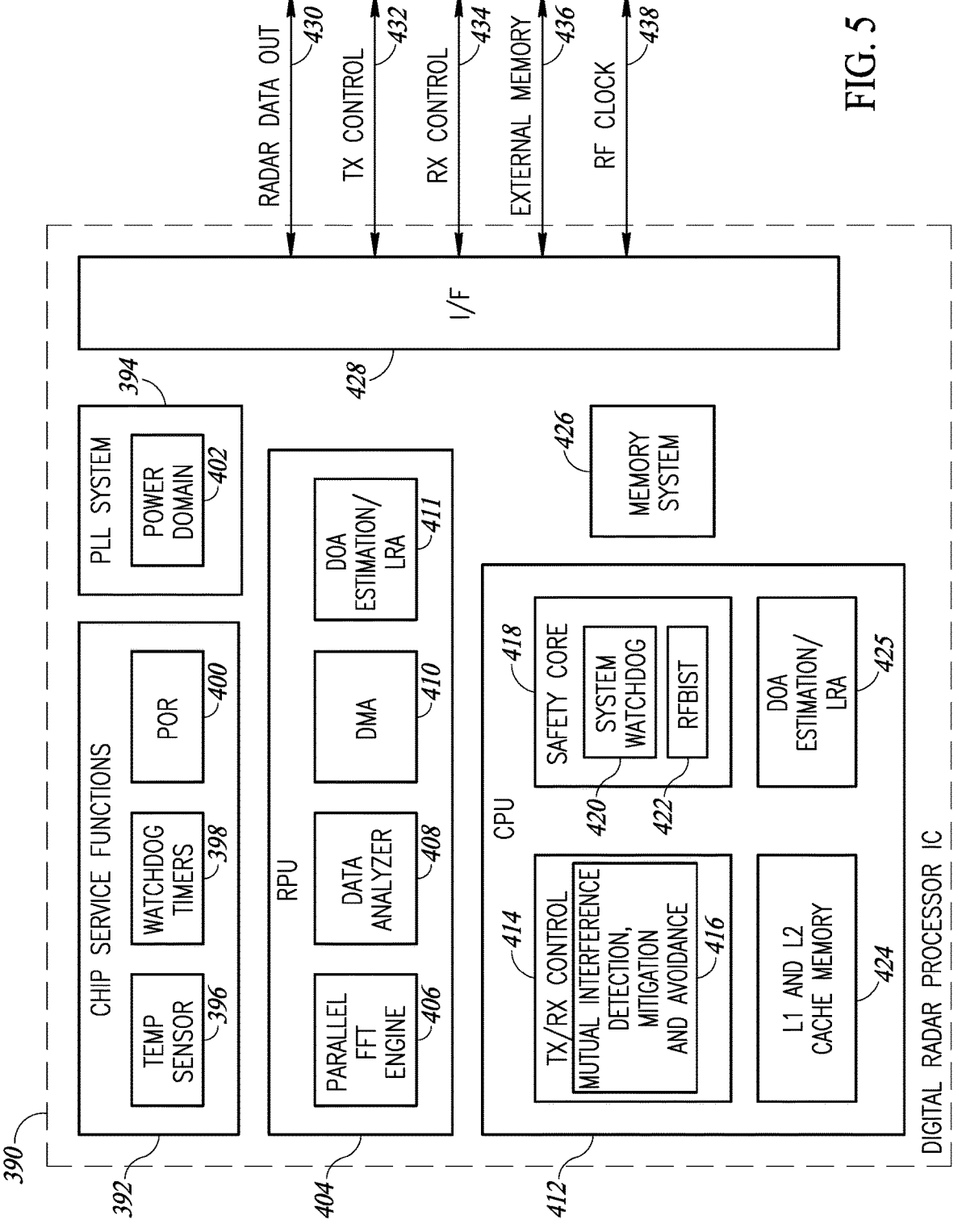
FIG. 5 is a block diagram illustrating an example digital radar processor (DRP) IC constructed in accordance with the present invention.

Frequency modulated continuous wave (FMCW) radars are radars in which frequency modulation is used. The theory of operation of FMCW radar is that a continuous wave with an increasing (or decreasing) frequency is transmitted. Such a wave is referred to as a chirp. An example of a chirp waveform 10 is shown in FIG. 4. A transmitted wave after being reflected by an object is received by a receiver. An example of a transmitted 12 and received (i.e. reflected) 14 chirp waveforms at the receiver is shown in FIG. 5.

Considering the use of radar for automotive applications, vehicle manufacturers can currently make use of four frequency bands at 24 GHz and 77 GHz with different bandwidths. While the 24 GHz ISM band has a maximum bandwidth of 250 MHz, the 76-81 GHz ultrawideband (UWB) offers up to 5 GHz. A band with up to 4 GHz bandwidth lies between the frequencies of 77 to 81 GHz. It is currently in use for numerous applications. Note that other allocated frequencies for this application include 122 GHz and 244 GHz with a bandwidth of only 1 GHz. Since the signal bandwidth determines the range resolution, having sufficient bandwidth is important in radar applications.

Conventional digital beam forming FMCW radars are characterized by very high resolution across radial, angular and Doppler dimensions. Imaging radars are based on the well-known technology of phased arrays, which use a Uniformly Linearly distributed Array (ULA). It is well known that the far field beam pattern of a linear array architecture is obtained using the Fourier transform. Range measurement is obtained by performing a Fourier transform on the de-ramped signal, generated by multiplying the conjugate of the transmitted signal with the received signal. The radar range resolution is determined by the RF bandwidth of the radar and is equal to the speed of light c divided by twice the RF bandwidth. Doppler processing is performed by performing a Fourier transform across the slow time dimension, and its resolution is limited by the Coherent Processing Interval (CPI). i.e. the total transmission time used for Doppler processing.

When using radar signals in automotive applications, it is desired to simultaneously determine the speed and distance of multiple objects within a single measurement cycle. Ordinary pulse radar cannot easily handle such a task since based on the timing offset between transmit and receive signals within a cycle, only the distance can be determined. If speed is also to be determined, a frequency modulated signal is used, e.g., a linear frequency modulated continuous wave (FMCW) signal. A pulse Doppler radar is also capable of measuring Doppler offsets directly. The frequency offset between transmit and receive signals is also known as the beat frequency. The beat frequency has a Doppler frequency component $f_D$ and a delay component $f_T$. The Doppler component contains information about the velocity, and the delay component contains information about the range. With two unknowns of range and velocity, two beat frequency measurements are needed to determine the desired parameters. Immediately after the first signal, a second signal with a linearly modified frequency is incorporated into the measurement.

Determination of both parameters within a single measurement cycle is possible with FM chirp sequences. Since a single chirp is very short compared with the total measurement cycle, each beat frequency is determined primarily by the delay component $f_T$. In this manner, the range can be ascertained directly after each chirp. Determining the phase shift between several successive chirps within a sequence permits the Doppler frequency to be determined using a Fourier transform, making it possible to calculate the speed of vehicles. Note that the speed resolution improves as the length of the measurement cycle is increased.

Multiple input multiple output (MIMO) radar is a type of radar which uses multiple TX and RX antennas to transmit and receive signals. Each transmitting antenna in the array independently radiates a waveform signal which is different than the signals radiated from the other antennae. Alternatively, the signals may be identical but transmitted at non overlapping times. The reflected signals belonging to each transmitter antenna can be easily separated in the receiver antennas since either (1) orthogonal waveforms are used in the transmission, or (2) because they are received at non overlapping times. A virtual array is created that contains information from each transmitting antenna to each receive antenna. Thus, if we have M number of transmit antennas and N number of receive antennas, we will have M·N independent transmit and receive antenna pairs in the virtual array by using only M+N number of physical antennas. This characteristic of MIMO radar systems results in several advantages such as increased spatial resolution, increased antenna aperture, and possibly higher sensitivity to detect slowly moving objects.

As stated supra, signals transmitted from different TX antennas are orthogonal. Orthogonality of the transmitted waveforms can be obtained by using time division multiplexing (TDM), frequency division multiplexing, or spatial coding. In the examples and description presented herein, TDM is used which allows only a single transmitter to transmit at each time.

The radar of the present invention is operative to reduce complexity, cost and power consumption by implementing a time multiplexed MIMO FMCW radar as opposed to full MIMO FMCW. A time multiplexed approach to automotive MIMO imaging radar has significant cost and power benefits associated with it compared to full MIMO radars. Full MIMO radars transmit several separable signals from multiple transmit array elements simultaneously. Those signals need to be separated at each receive channel, typically using a bank of matched filters. In this case, the complete virtual array is populated all at once.

With time multiplexed MIMO, only one transmit (TX) array element transmits at a time. The transmit side is greatly simplified, and there is no need for a bank of matched filters for each receive (RX) channel. The virtual array is progressively populated over the time it takes to transmit from all the TX elements in the array.

Figure 2:
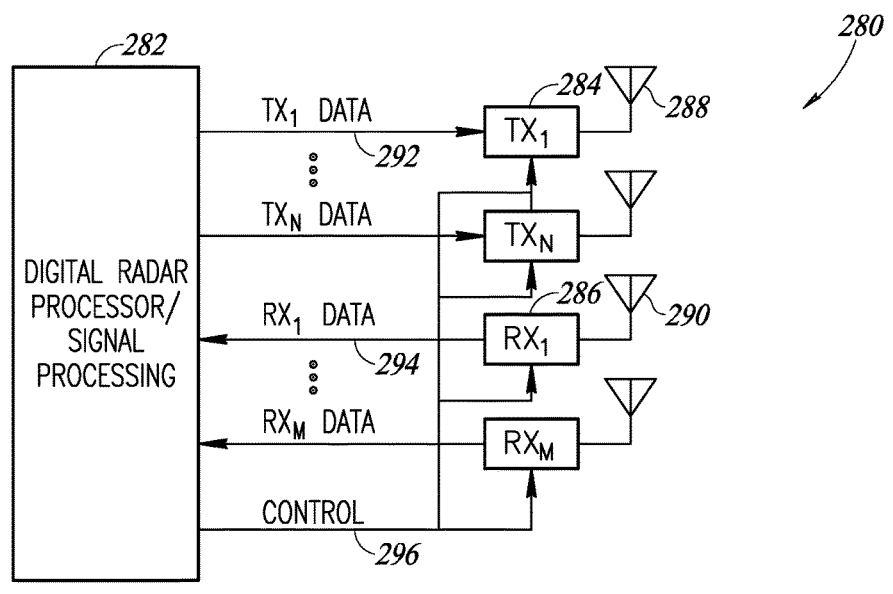
FIG. 2 is a diagram illustrating an example radar system incorporating a plurality of receivers and transmitters.

A high-level block diagram illustrating an example radar system incorporating a plurality of receivers and transmitters is shown in FIG. 2. The radar system, generally referenced 280, comprises a digital radar processor (DRP)/signal processor 282 for performing, inter alia, signal processing functions including the direction of arrival (DOA) estimation utilizing low rank approximation (LRA) mechanism of the present invention, a plurality N of transmitter devices TX1 to TXN 284, each coupled to a transmit antenna 288, a plurality M of receiver devices RX1 to RXM 286, each coupled to a receive antenna 290. TX data lines 292 connect the DRP to the transmitter devices, RX lines 294 connect the receiver devices to the DRP, and control signal 296 are provided by the DRP to each of the transmitter and receiver devices, 284, 286, respectively. Note that N and M may be any positive integer greater than one.

Figure 3:
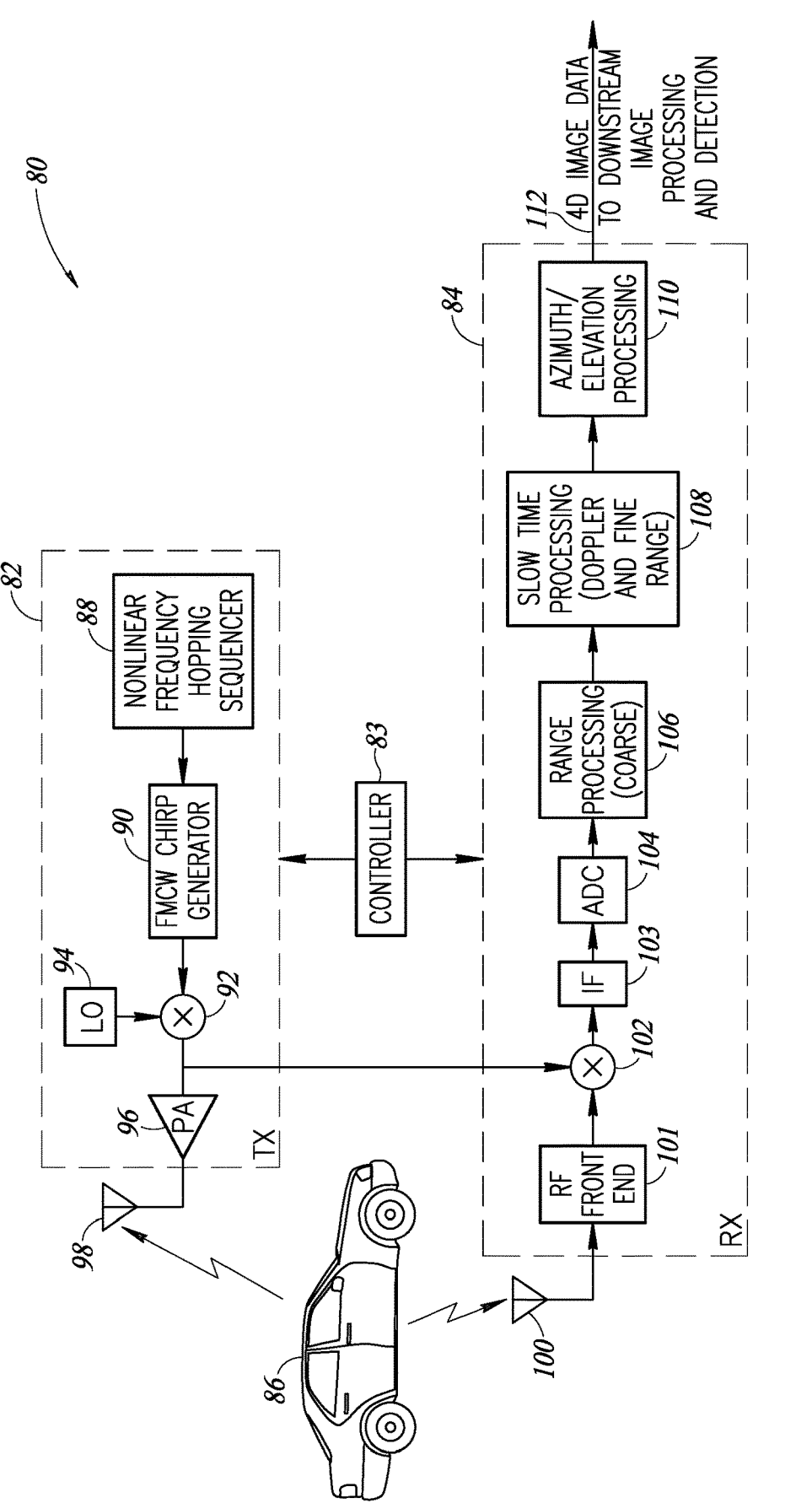
FIG. 3 is a diagram illustrating an example radar transceiver constructed in accordance with the present invention.

A diagram illustrating an example radar transceiver constructed in accordance with the present invention is shown in FIG. 3. The radar transceiver, generally referenced 80, comprises transmitter 82, receiver 84, and controller 83. The transmitter 82 comprises nonlinear frequency hopping sequencer 88, FMCW chirp generator 90, local oscillator (LO) 94, mixer 92, power amplifier (PA) 96, and antenna 98.

The receiver 84 comprises antenna 100, RF front end 101, mixer 102, IF block 103, ADC 104, fast time range processing 106, slow time processing (Doppler and fine range) 108, and azimuth and elevation processing 110.

In operation, the nonlinear frequency hopping sequencer 88 generates the nonlinear start frequency hop sequence. The start frequency for each chirp is input to the FMCW chirp generator 90 which functions to generate the chirp waveform at the particular start frequency. The chirps are upconverted via mixer 92 to the appropriate band in accordance with LO 94 (e.g., 80 GHz band). The upconverted RF signal is amplified via PA 96 and output to antenna 98 which may comprise an antenna array in the case of a MIMO radar.

On the receive side, the echo signal arriving at antenna 100-is input to RF front end block 101. In a MIMO radar, the receive antenna 100 comprises an antenna array. The signal from the RF front end circuit is mixed with the transmitted signal via mixer 102 to generate the beat frequency which is input to IF filter block 103. The output of the IF block is converted to digital via ADC 104 and input to the fast time processing block 106 to generate coarse range data. The slow time processing block 108 functions to generate both fine range and Doppler velocity data. Azimuth and elevation data are then calculated via azimuth/elevation processing block 110. The 4D image data 112 is input to downstream image processing and detection. Note that in one embodiment, azimuth/elevation processing block 110 implements the direction of arrival (DOA) estimation utilizing low rank approximation (LRA) mechanism of the present invention.

A high-level block diagram illustrating an example MIMO FMCW radar in accordance with the present invention is shown in FIG. 4. The radar transceiver sensor, generally referenced 40, comprises a plurality of transmit circuits 66, a plurality of receive circuits 58, ramp or chirp generator 60 including local oscillator (LO) 61, nonlinear frequency hopping sequencer 62, optional TX element sequencer 75 (dashed), and digital radar processor (DRP)/signal processing block 44 which in one embodiment includes block 45 that implements the direction of arrival (DOA) estimation utilizing the low rank approximation (LRA) mechanism of the present invention. In operation, the radar transceiver sensor typically communicates with and may be controlled by a host 42. Each transmit block comprises power amplifier 70 and antenna 72. The transmitters receive the transmit signal output of the chirp generator 60 which is fed to the PA in each transmit block. The optional TX element sequencer (dashed) generates a plurality of enable signals 64 that control the transmit element sequence. It is appreciated that DOA estimation may be implemented in a radar system with or without TX element sequencing and with or without MIMO operation. Further, DOA estimation is not limited to implementation in MIMO FMCW radars but may be implemented using other types of radar systems as well.

Each receive block comprises an antenna 58, low noise amplifier (LNA) 50, mixer 52, intermediate frequency (IF) block 54, and analog to digital converter (ADC) 56. Signal processing block 44 may comprise any suitable electronic device capable of processing, receiving, or transmitting data or instructions. For example, the processing units may include one or more of: a microprocessor, a central processing unit (CPU), an application-specific integrated circuit (ASIC), field programmable gate array (FPGA), a digital signal processor (DSP), graphical processing unit (GPU), or combinations of such devices. As described herein, the term "processor" is meant to encompass a single or processing unit, multiple processors, processor multiple processing units, or other suitably configured computing element or elements.

For example, the processor may comprise one or more general purpose CPU cores and optionally one or more special purpose cores (e.g., DSP core, floating point, gate array, etc.). The one or more general purpose cores execute general purpose opcodes while the special purpose cores execute functions specific to their purpose.

Attached or embedded memory comprises dynamic random access memory (DRAM) or extended data out (EDO) memory, or other types of memory such as ROM, static RAM, flash, and non-volatile static random access memory (NVSRAM), removable memory, bubble memory, etc., or combinations of any of the above. The memory stores electronic data that can be used by the device. For example, a memory can store electrical data or content such as, for example, radar related data, audio and video files, documents and applications, device settings and user preferences, timing and control signals or data for the various modules, data structures or databases, and so on. The memory can be configured as any type of memory.

Transmitted and received signals are mixed (i.e. multiplied) to generate the signal to be processed by signal processing unit 44. The multiplication process generates two signals: one with a phase equal to the difference of the multiplied signals, and the other one with a phase equal to the sum of the phases. The sum signal is filtered out and the difference signal is processed by the signal processing unit. The signal processing unit performs all the required processing of the received digital signals and controls the transmitted signal as well. Several functions performed by the signal processing block include determining coarse range, velocity (i.e. Doppler), fine range, elevation, azimuth performing interference detection, mitigation and avoidance, performing simultaneous locating and mapping (SLAM), etc.

A block diagram illustrating an example digital radar processor IC of the present invention is shown in FIG. 5. The radar processor IC, generally referenced 390, comprises several chip service functions 392 including temperature sensor circuit 396, watchdog timers 398, power on reset (POR) circuit 400, etc., PLL system 394 including power domain circuit 402, radar processing unit (RPU) 404 including parallel FFT engine 406, data analyzer circuit 408, direct memory access (DMA) circuit 410 and DOA estimation/LRA mechanism 411, CPU block 412 including TX/RX control block 414, safety core block 418, and L1 and L2 cache memory circuit 424 and DOA estimation/LRA mechanism 425, memory system 426 and interface (I/F) circuit 428. In one embodiment, the RPU is configured to implement the direction of arrival (DOA) estimation utilizing low rank approximation (LRA) mechanism of the present invention either in the RPU or in the CPU or partially in both.

The TX/RX control circuit 414 may incorporate settling time control for eliminating frequency source settling time, mutual interference, detection, mitigation, and avoidance block 416. The safety core block 418 includes system watchdog timer circuitry 420 and RFBIST circuit adapted to perform continuous testing of the RF elements in the radar system. The I/F circuit includes interfaces for radar output data 430, TX control 432, RX control 434, external memory 436, and RF clock 438.

Note that the digital radar processor circuit 390 can be implemented on monolithic silicon or across several integrated circuits, depending on the particular implementation. Similarly, the transmitter and receiver circuits can be implemented on a single IC or across several ICs depending on the particular implementation.

In one embodiment, the DRP 390 is used in an automotive radar FMCW MIMO based system. Such a system requires a plurality of transmitter and receiver channels to achieve desired range, azimuth, elevation and velocity. The higher the number of channels, the better the resolution performance. Depending on the implementation, multiple transmit channels may be incorporated in a single chip and multiple receive channels may be incorporated in a single chip. The system may comprise multiple TX and RX chips. Each TX and RX chip is operable as part of a larger system adapted to achieve maximum system performance. In one embodiment, the system also includes at least one control channel. The control channel is operative to configure the both TX and RX devices.

The present invention provides a compact radar switch array antenna with high azimuth and elevation angular resolution and accuracy, and increased effective aperture, while using a low number of TX and RX elements. The invention also provides a compact radar antenna array with high azimuth and elevation angular resolution and accuracy, and increased effective aperture, while reducing unwanted side lobes.

One embodiment of the present invention is directed to a method for increasing the effective aperture of a radar switch/MIMO antenna array using a low number of transmit and receive array elements. An array of physical radar receive/transmit elements are arranged in at least two opposing RX rows and at least two opposing TX columns, such that each row includes a plurality of receive elements uniformly spaced from each other and each column includes a plurality of transmit elements uniformly spaced from each other, the array forming a rectangular physical aperture.

Used as a switch array, a first TX element from one column is activated to transmit a radar pulse during a predetermined time slot. Reflections of the first transmission are received by all RX elements, thereby virtually replicating the two opposing RX rows about an origin determined by the location of the first TX element within the rectangular physical aperture.

This process is repeated for all remaining TX elements during different time slots, thereby virtually replicating the two opposing RX rows about an origin determined by the location of each activated TX element within the rectangular physical aperture. During each time period, reflections of the transmission from each TX element are received by all RX elements. In this manner, a rectangular virtual aperture having dimensions twice the dimensions of the rectangular physical aperture is achieved with replicated two opposing RX rows. This virtual aperture determines the radar beam width and sidelobes.

Note that the above replication method works equally well in a MIMO or hybrid switch/MIMO design where some signals are transmitted simultaneously by a plurality of TX array elements using orthogonal waveforms which are later separated in the receiver.

Extended Virtual Array

As discussed supra, a challenge of automotive radars is how to increase the resolution while not adding significant cost and complexity to the radar system. One way to achieve this is to extend the virtual array by adding additional TX and/or RX antenna elements.

Figures 6A, 6B, 6C:
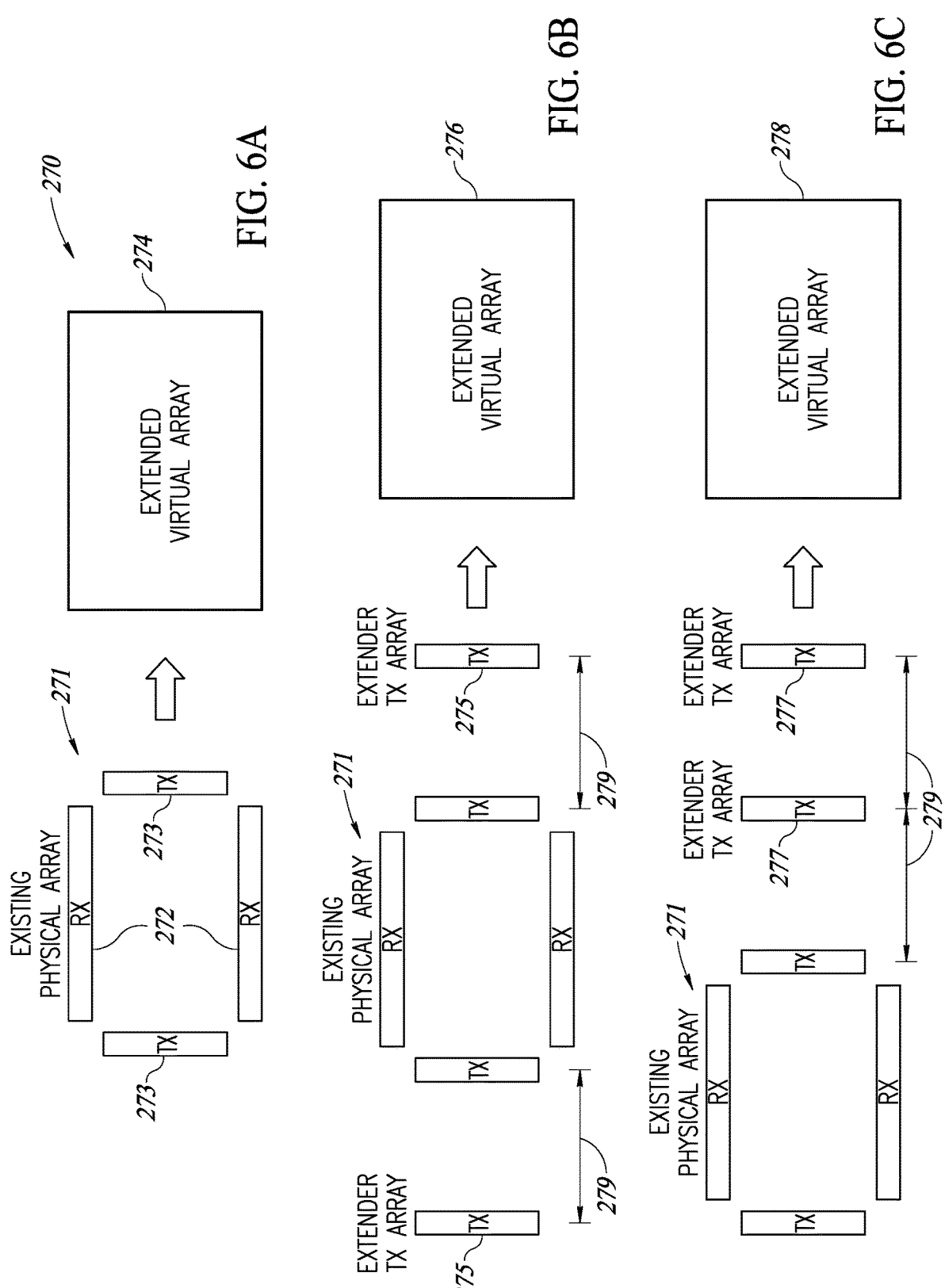
FIG. 6A is a diagram illustrating an example existing MIMO physical array and resulting virtual array.
FIG. 6B is a diagram illustrating a first example existing MIMO physical array with two extender PCBs and resulting virtual array.
FIG. 6C is a diagram illustrating a second example existing MIMO physical array with two extender PCBs and resulting virtual array.

A diagram illustrating an example existing MIMO physical array and resulting virtual array is shown in FIG. 6A. The existing physical antenna array, generally referenced 271, comprises a plurality of transmit elements 273 and a plurality of receive elements 272. In the example shown, the physical antenna array comprises TX elements arranged in left and right TX columns 273 and RX elements arranged in upper and lower rows 272.

Each transmitting antenna element in the array independently radiates a waveform signal which is different than the signals radiated from the other antennae. Alternatively, the signals may be identical but transmitted at nonoverlapping times. The reflected signals belonging to each transmitter antenna can be easily separated in the receiver antennas since either (1) orthogonal waveforms are used in the transmission, or (2) because they are received at nonoverlapping times. A virtual array is created that contains information from each transmitting antenna to each receive antenna. Thus, providing M transmit antennas and K receive antennas results in M·K independent transmit and receive antenna pairs in the virtual array by using only M+K number of physical antennas. This characteristic of MIMO radar systems results in several advantages such as increased spatial resolution, increased antenna aperture, and higher sensitivity to detect slowly moving objects.

The virtual array 274 results from the physical antenna array 271. The virtual array is created by the convolution of the transmit and receive arrays. For the example physical antenna array shown, after MIMO processing, the physical antenna array results in a virtual array that is four times the size of the physical array resulting in a significant increase in resolution without requiring a large number of physical elements.

As stated supra, signals transmitted from different TX antennas are orthogonal. Orthogonality of the transmitted waveforms can be obtained by using time division multiplexing (TDM), frequency division multiplexing, or spatial coding. In the examples and description presented herein, TDM is used which allows only a single transmitter to transmit at each time.

As discussed supra, one way to increase resolution is to add additional TX or RX antenna elements to the physical array. To increase azimuth resolution for example, additional TX columns are added to the existing physical antenna array. One or more extender PCBs that include the additional TX antenna elements are added at a set distance and orientation from the existing main PCB. Note that the precision of the placement of the one or more extender PCBs is in the order of a few tens of microns. The more the distance and orientation between the main PCB and extender PCBs is out of tolerance, the bigger unwanted sidelobes become.

In accordance with one embodiment of the invention, one or more separate extender PCB modules having only TX antenna channels are used to extend the existing TX array to increase the virtual aperture of the radar. The extender modules may be added on either side of the existing PCB. Note that the position of the added TX columns will determine the resulting virtual array. Preferably, the added TX antenna modules are positioned (by distance and orientation) such that the resulting virtual array is full with neither gaps nor duplications.

In one embodiment, the one or more extender antenna modules as well as the main PCB are placed in housings. The extender module housing are fastened to the main PCB housing via rigid mechanical means. Alternatively, the one or more extender antenna modules may be attached directly to either the main PCB housing or the main PCB itself.

The low frequency LO as well as low frequency controls and synchronization signal lines are coupling between the main array and the one or more extender arrays. The signal connection(s) may comprise RF, electrical, and/or waveguide connections or any combination thereof.

One benefit of the virtual array extension mechanism of the present invention is that there is no need to add additional receive channels which would otherwise increase the cost and complexity of the radar system. This technique can be used to improve the physical beam width of the virtual array by a factor of 1.5 or more, depending on the number of TX columns that are added.

Note that the mechanism described herein is applicable if TX and RX are reversed such that the TX antenna elements are arranged in rows and RX antenna elements are arranged in columns and the resulting virtual array is extended vertical rather than horizontally thus improving elevation resolution rather than azimuth resolution.

Note also that in accordance with an embodiment of the invention, the radar system including the existing main radar and one or more extender modules can be mechanically adjusted to conform to the physical features of different vehicles by appropriate configuration of the mechanical coupling as well as signal connections (e.g., via simple waveguide design or use of one or more low cost RF cables).

Note further that use of the extension mechanism of the present invention may result in a virtual array that is relatively very dense. Each extender module and/or the entire radar system can be calibrated in the factory (before installation on a vehicle) and any calibration imperfections caused by the installation on the car can be fixed using adaptive auto focus algorithms (e.g., phase gradient decent, etc.). These include small offsets in any coordinate and rotation (i.e. orientation) of the modules relative to their nominal place, including when the main PCB module and the extender PCB modules are not even coplanar.

It is also appreciated that additional memory and computational power will typically be needed to process the extended virtual array as well as to compensate for installation tolerances as described herein.

A diagram illustrating a first example existing MIMO physical array with two extender PCBs and resulting virtual array is shown in FIG. 6B. In this example, two extender TX antenna arrays 275 are added on either side of the existing main PCB antenna array 271. The extender PCBs are separated by a set distance and orientation 279 from the main PCB to a certain tolerance. Adding two extender TX arrays results in a virtual array 276 that is twice (2×) the resolution of the original virtual array 274 (FIG. 6A).

Note that the improvement in resolution of the virtual array is dependent on the distance between the main board and the extender modules. The distance can be adjusted to increase resolution even further in some configurations depending on the particular implementation.

A diagram illustrating a second example existing MTMO physical array with two extender PCBs and resulting virtual array is shown in FIG. 6C. In this example, two extender TX antenna arrays 277 are both added on one side of the existing main PCB antenna array 271. The extender PCBs are separated by a set distance and orientation 279 from the main PCB and to each other to a certain tolerance. Adding two extender TX arrays results in a virtual array 278 that is twice (2×) the resolution of the original virtual array 274 (FIG. 6A) similar to the virtual array 276 of FIG. 6B. In this case the resulting virtual array is the same for both physical antenna configurations shown in FIGS. 6B and 6C.

Figure 7:
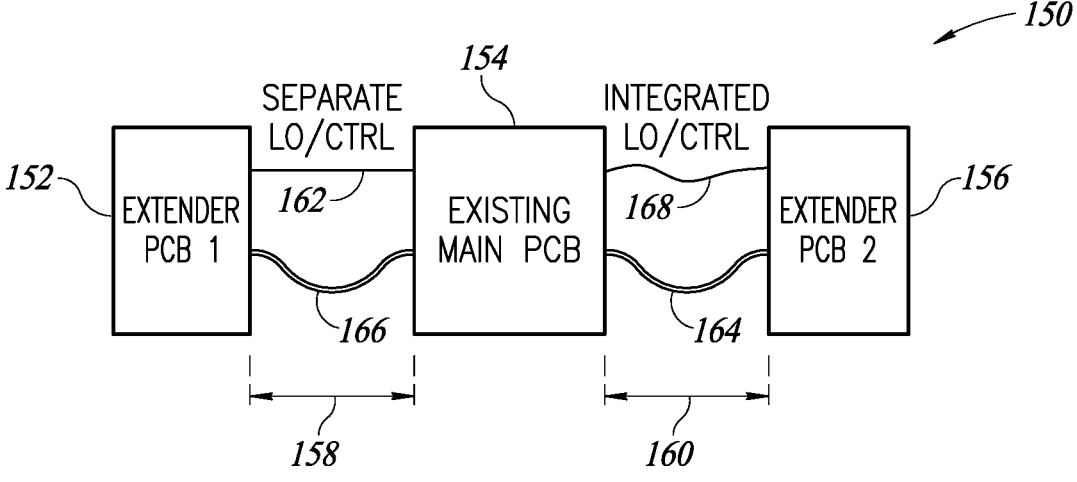
FIG. 7 is a diagram illustrating an example existing main PCB and multiple extender PCBs connected by separate and integrated LO/ctrl connections.

A diagram illustrating an example existing main PCB and multiple extender PCBs connected by separate and integrated LO/control connections is shown in FIG. 7. The radar, generally referenced 150, comprises an existing main PCB 154 and in this example embodiment two extender PCBs 152, 156 that are coupled to the main PCB. The extender PCBs 1 and 2 are located on either side of the main PCB but alternatively may both be located on one side of the main PCB. The extender PCBs contain the additional TX antenna array elements which are typically placed in a housing but may not be depending on the particular implementation. A set precise distance and orientation between the main PCB and the extender PCBs is maintained via a rigid mechanical connection 166, 164. In one embodiment, the housings incorporating the main PCB and extended TX arrays are mechanically connected using any suitable rigid means such as one or more metal bars, pipes, strips, beams, metal frame members, etc. It is noted that the actual mechanical means used is not critical to the invention as long as sufficient rigidity is provided. Sufficient rigidity allows for the one or more extender PCBs to maintain their distance and orientation from the main PCB such that factory calibration of the radar is possible at the time of manufacture of the radar without requiring calibration after installation in a target vehicle (other than minor fine tuning process after installation in the vehicle).

In one embodiment, the shape of the rigid mechanical means is adapted to conform to any mechanical constraints presented by the vehicle the radar is to be installed in. Thus, depending on the particular constraints of the vehicle mounting area, the mechanical connection or assembly can be designed a priori to conform to any protrusions, barriers, obstructions, etc. the vehicle presents so as to maintain the desired precise distance and orientation between the extender PCBs and the main PCB. Note that although a single mechanical connection is shown, the invention is not limited to that. It is appreciated by one skilled in the art that the mechanical connection may comprise a plurality of separate or joined mechanical members or parts such as shown in 164, 168 (i.e. two mechanical members). In addition, the mechanical connection that connects each extender PCB may be different from the others and not necessarily the same across all extender PCBs. Thus, depending on the particular vehicle, with any number of special mounting requirements, the mechanical assembly connecting each extender PCB to the main PCB may all be unique and different from each other.

In addition to the mechanical coupling between the extender and main PCBs, one or more connections for the local oscillator (LO) signal and related synchronization and control signals is also provided. These signal connections may be separate from the mechanical connection or they may be integrated, such as inside a hollow bar or pipe. For example separate LO/control signals 162 connect the main PCB to extender PCB 1 while LO/control signals connecting the main PCB to extender PCB 2 are integrated within one or both of the two mechanical connections 164, 168.

Figure 8:
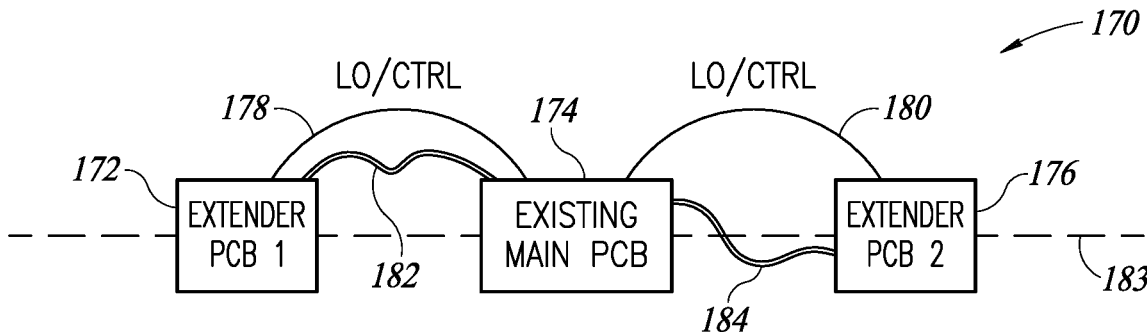
FIG. 8 is a diagram illustrating an example top view of the existing main PCB and multiple extender PCBs coplanar with each other.

A diagram illustrating an example top view of the existing main PCB and multiple extender PCBs coplanar with each other is shown in FIG. 8. In one embodiment, the one or more extender antenna array PCBs are substantially coplanar to a certain tolerance with the main PCB antenna array as if all the antenna arrays were on the same PCB. This is shown via dashed line 183 which indicates the plane all the antenna arrays preferably lie in. Calibration of the radar may be able to compensate to some extent for misalignment of the one or more extender antenna array PCBs with the main PCB.

The radar, generally referenced 170, comprises an existing main PCB 174 and in this example embodiment two extender PCBs 172, 176 that are coupled to the main PCB. The extender PCBs 1 and 2 are located on either side of the main PCB but alternatively may both be located on the same side of the main PCB. The extender PCBs contain the additional TX antenna array elements typically placed in a housing. A precise distance and orientation (to within an acceptable tolerance) between the main PCB and the extender PCBs is maintained via a rigid mechanical connection 182, 184. In one embodiment, the housings incorporating the main PCB and extended TX arrays are mechanically connected using any suitable rigid means such as one or more metal bars, pipes, beams, metal frame members, etc.

In addition to the mechanical coupling between the extender and main PCBs, one or more connections for the local oscillator (LO) signal and related synchronization and control signals is also provided. For example separate LO/control signals 178 connect the main PCB to extender PCB 1 and LO/control signals 180 connect the main PCB to extender PCB 2.

Figure 9:
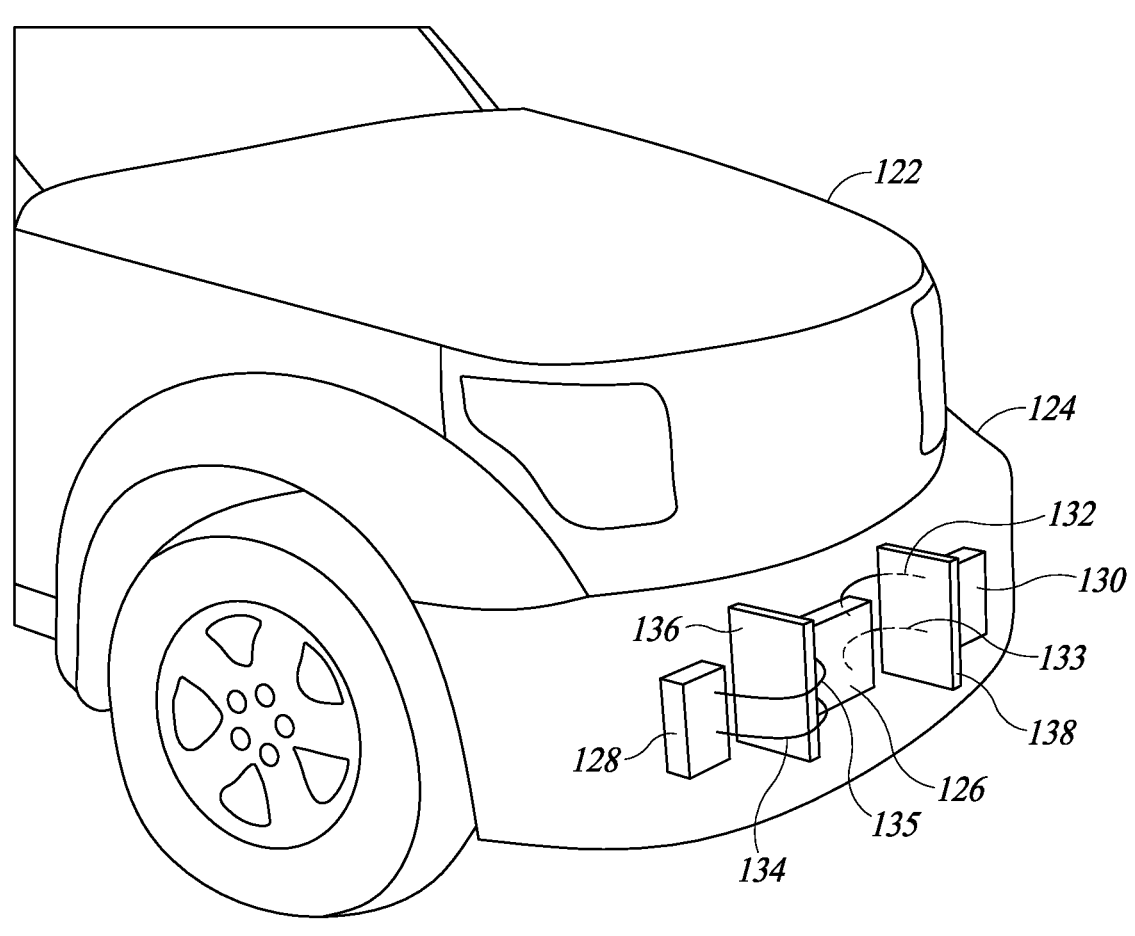
FIG. 9 is a diagram illustrating an example existing main PCB and multiple extender PCBs mechanically coupled to each other and mounted in a vehicle bumper.

As example installation of the radar with extender PCBs in a vehicle will now be presented. A diagram illustrating an example existing main PCB and multiple extender PCBs mechanically coupled to each other and mounted in a vehicle bumper is shown in FIG. 9. The vehicle 122 includes a bumper assembly 124 in which the radar is to be installed. Several protrusions or obstructions 136, 133 are present in the bumper assembly. The radar includes two extender antenna array PCBs 128, 130 rigidly mechanically connected to the main PCB 126. Mechanical coupling 132 connects extender PCB 128 to the main PCB while mechanical coupling 134 connects extender PCB 130 to the main PCB. Electrical signal connection 133 connects LO, synchronization, and control signals between the main PCB and extender PCB 130. Electrical signal connection 135 connects LO, synchronization, and control signals between the main PCB and extender PCB 128. In accordance with the invention, the rigid mechanical couplings 132, 134 are configured to conform to the protrusions 136, 138 so as to maintain a set precise distance and orientation between the extender and main PCBs. It is noted that in one embodiment, the main PCB and extender PCBs are placed in housings and it is the housings that are rigidly mechanically coupled to each other. Otherwise, depending on the implementation, the main PCB and/or the extender PCBs themselves are rigidly mechanically coupled to each other.

Figure 10:
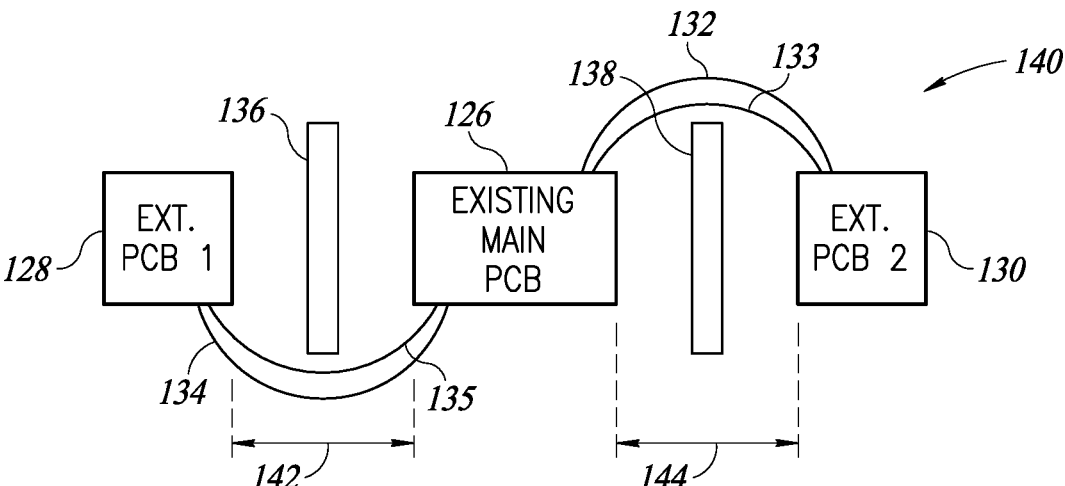
FIG. 10 is a diagram illustrating the radar system of FIG. 9 in more detail.

A diagram illustrating the radar system of FIG. 9 in more detail is shown in FIG. 10. The radar, generally referenced 140, comprises a main PCB 126 and a pair of extender PCBs 128, 130 in housings. In this example, mechanical coupling 134 connects the main PCB to extender PCB 1 and electrical connections 135 are placed above the mechanical coupling on the left side of the main PCB. Both are configured to go around the front of the bumper protrusion 136. Mechanical coupling 132 connects the main PCB to extender PCB 2 and electrical connections 133 are placed below the mechanical coupling on the right side of the main PCB. Both are configured to go around the front of the bumper protrusion 138.

Figure 11:
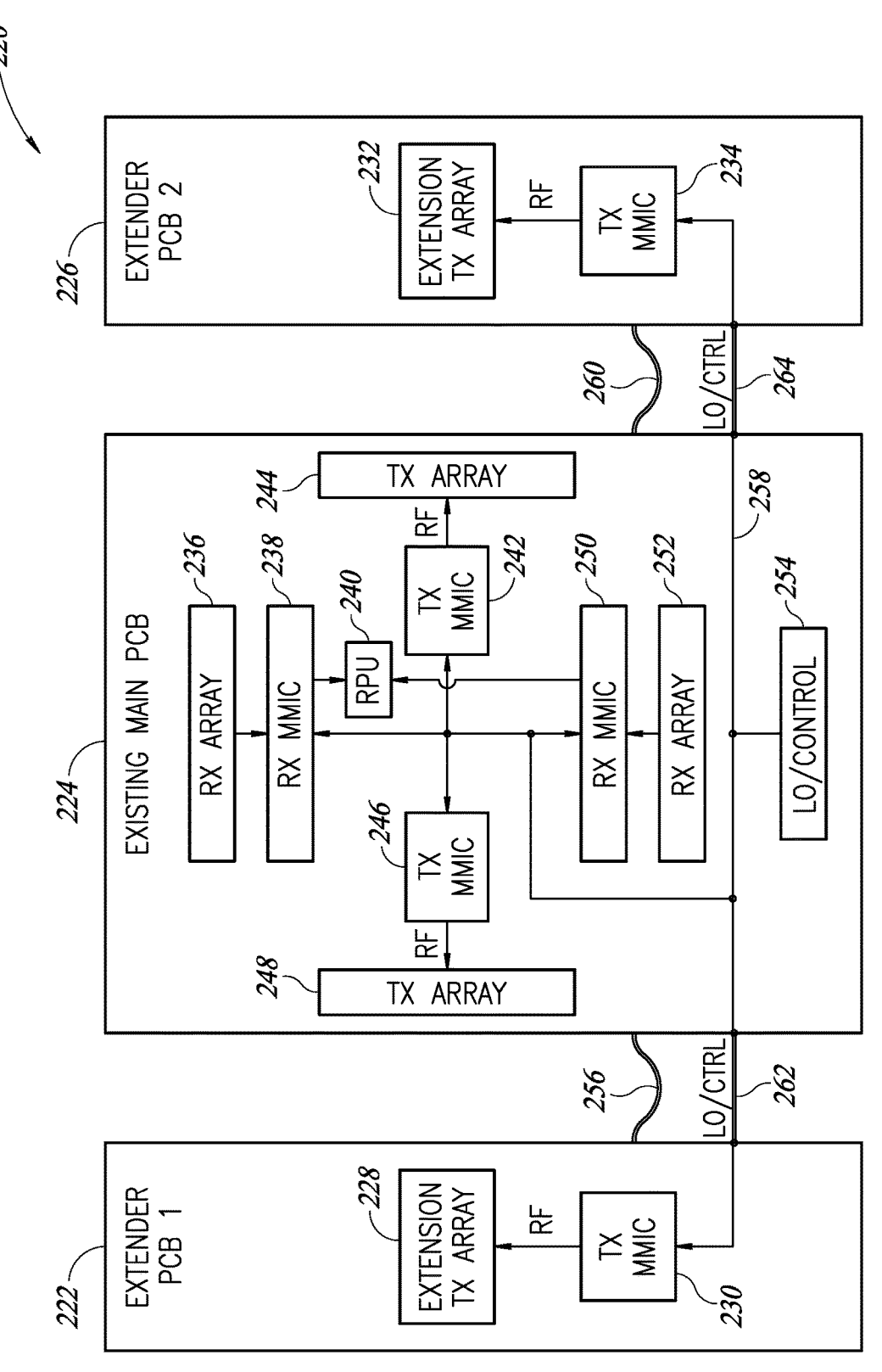
FIG. 11 is a block diagram illustrating an example existing main PCB and multiple extender PCBs in more detail.
Figure 12:
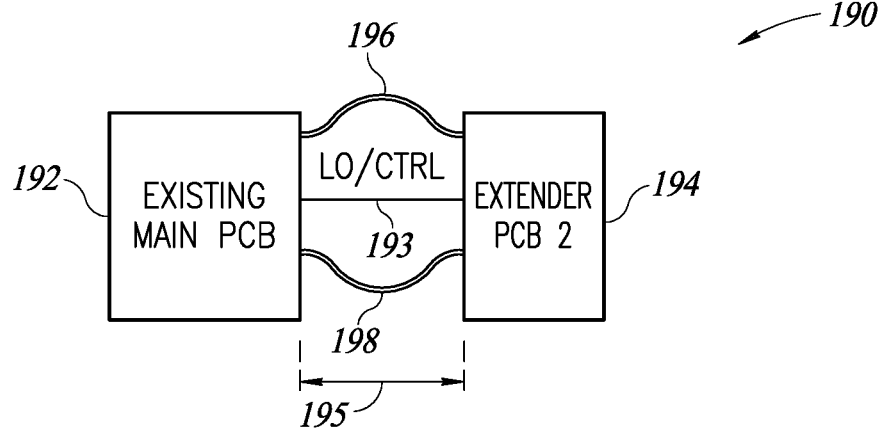
FIG. 12 is a block diagram illustrating an example existing main PCB and a single extender PCB.

A block diagram illustrating an example existing main PCB and multiple extender PCBs in more detail is shown in FIG. 11. In this embodiment, two extender PCBs 1 and 2 are shown connected to the main PCB for illustration purposes only. It is appreciated that radar systems may have a number of extender PCBs other than two. The radar system, generally referenced 220, comprises existing main PCB 224, extender PCB 1 222, and extender PCB 2 226. The existing main PCB comprises one or more TX and RX arrays, processing units, transmit and receive circuitry, etc. while the extender PCBs contain additional TX or RX antenna arrays.

In this example embodiment, the main PCB comprises LO and synchronization and control circuit 254. The LO and appropriate control signals are input to RX and TX monolithic microwave integrated circuits (MMICs) on the main PCB as well as TX MMICs on the two extender PCBs. Transmitter circuitry on the TX MMICs 246, 242 generate RF transmit signals for the two TX antenna arrays 248, 244 arranged as columns on the left and right sides, respectively. Receive signals generated by the two RX antenna arrays 236, 252 arranged as rows on the upper and lower sides are fed to the receive circuits in the two RX MMICs 238, 250, respectively. The radar return output of the RX MMICs from the two RX antennas arrays are input to the radar processing unit (RPU) 240 for further processing.

To extend the virtual array from its original size (i.e. without the extender PCBs) thereby increasing the resolution, additional extender PCBs are added to the radar system. Azimuth resolution is improved by adding one or more additional TX antenna arrays to supplement the existing main array(s). Additional extender antenna arrays added to the left and/or right sides of the main PCB improve azimuth resolution while additional extender antenna arrays added to the upper and/or lower sides of the main PCB improve elevation resolution.

In this example embodiment, extension TX arrays are added to the left and right sides of the main PCB thus improving resolution in azimuth. Extender PCB 1 comprises TX MMIC 230 that generates RF transmit signals input to extension TX antenna array 228. The LO and related sync and control signals from the main PCB are coupled to the extender PCB 1 via one or more cables 262. Note that the LO may be provided to the extender PCBs via any suitable means including RF, electrical, or waveguide. In addition, in order to maintain the extender PCB at a precise fixed distance from the main PCB in accordance with the desired virtual array, a rigid mechanical coupling 256 is provided.

Extender PCB 2 comprises TX MMIC 234 that generates RF transmit signals input to extension TX antenna array 232. The LO and related sync and control signals from the main PCB are coupled to the extender PCB 2 via one or more cables 264. Note that the LO may be provided to the extender PCBs via any suitable means including RF, electrical, or waveguide. In addition, in order to maintain the extender PCB at a precise fixed distance from the main PCB in accordance with the desired virtual array, a rigid mechanical coupling 260 is provided.

Note that the LO signal may be fed to the extender PCBs from the main PCB using any suitable means such as wireless RF, electrical, or waveguide. The synchronization and control signals are typically sent as wired electrical connections from the main PCB to the extender PCBs.

As described supra, the mechanical coupling may comprise any suitable means and may comprise one or more members making up a mechanical assembly. Further, the mechanical coupling may be hollow allowing for placement of the LO and/or synch and control signals therein. In addition, the mechanical coupling may be configured to conform to the particular features of the vehicle it is intended to be installed in, e.g., obstructions, barriers, protuberances, protrusions, bumps, etc. in the area where the radar is to be installed. Also, the rigidity of the mechanical coupling is capable of sufficiently securing the extender PCBs in their housing to the housing of the main PCB such that (1) the extender PCBs remain at a fixed precise distance and orientation to within a predetermined tolerance to avoid excessive side lobes (e.g., tens of microns); and (2) calibration of the radar can be performed in the factory at the time of manufacture of the radar and only minor fine tuning is required at the vehicle assembly plant after installation on the vehicle.

Figure 13:
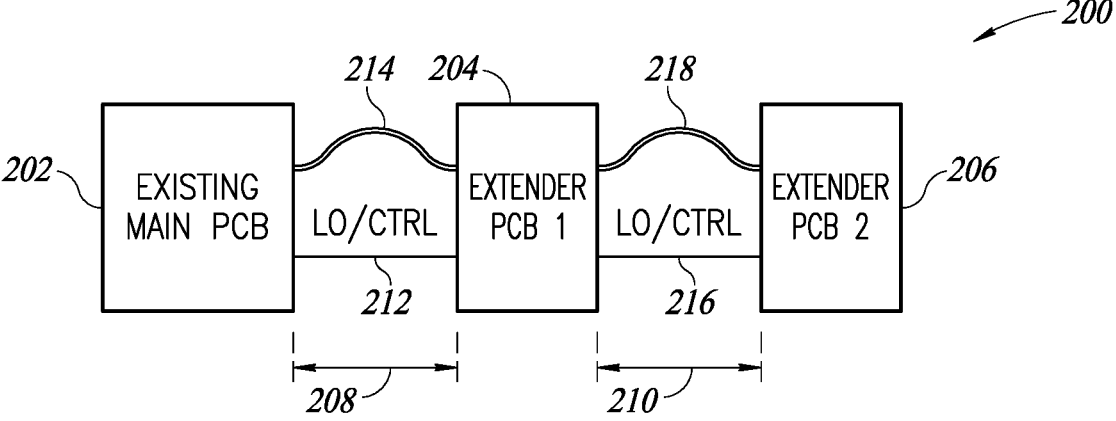
FIG. 13 is a block diagram illustrating an example existing main PCB and two extender PCBs on the same side of the main PCB.

A block diagram illustrating an example existing main PCB and two extender PCBs on the same side of the main PCB is shown in FIG. 13. The radar, generally referenced 200, comprises an existing main PCB 202 and a pair of extender PCBs 204, 206. Extender PCB 1 is connected by rigid mechanical connection 214 and electrical connection 212 for LO, synchronization, and control signals. Extender PCB 2 is connected by rigid mechanical connection 218 and electrical connection 216 for LO, synchronization, and control signals. Mechanical connection 214 maintains the main PCB a set precise distance 208 from extender PCB 1 in accordance with the desired virtual array. Mechanical connection 218 maintains extender PCB 2 a set precise distance 210 from extender PCB 1 in accordance with the desired virtual array. Using two extension antenna arrays results in a virtual array 2 times (2×) the size of the original virtual array.

A block diagram illustrating an example existing main PCB and two extender PCBs on the same side of the main PCB is shown in FIG. 13. The radar, generally referenced 200, comprises an existing main PCB 202 and a pair of extender PCBs 204, 206. Extender PCB 1 is connected by rigid mechanical connection 214 and electrical connection 212 for LO, synchronization, and control signals. Extender PCB 2 is connected by rigid mechanical connection 218 and electrical connection 216 for LO, synchronization, and control signals. Mechanical connection 214 maintains the main PCB a set precise distance 208 from extender PCB 1 in accordance with the desired virtual array. Mechanical connection 218 maintains extender PCB 2 a set precise distance 210 from extender PCB 1 in accordance with the desired virtual array. Using two extension antenna arrays results in a virtual array 2 times (2×) the size of the original virtual array.

It is appreciated that additional extender antenna arrays may be added to further improve the resolution of the virtual array. Adding extender antenna arrays comprising TX antenna arrays increases the resolution in azimuth. Alternatively, extender arrays comprising RX antenna arrays may be added as well.

To improve resolution in elevation, TX or RX antennas can be added above and/or below the main PCB rather than to the left and/or right of the main PCB which improves azimuth resolution. Further, extender antenna arrays can be added above and/or below as well as to the left and/or right of the main PCB to extend the virtual array to improve both azimuth and elevation.

Note that the mechanism of extending the virtual array of a radar is not limited by the modulation or waveform used. The modulation and waveform disclosed herein are intended to be examples only and not limiting the applicability of the mechanism to other types of radar systems.

A flow diagram illustrating an example method of extending a virtual array is shown in FIG. 14. Initially, the desired increase in the existing virtual array is determined which translates to a certain resolution improvement in azimuth (or elevation) (step 270). Depending on the desired improvement, an appropriate number of extension antenna array modules to add is determined (step 271). For example, for a 1.5× extension of the virtual array, a single extender array module is added to the existing radar. For a 2× extension of the virtual array, two extender array modules are added to the existing radar. For a 3× extension of the virtual array, four extender array modules are added to the existing radar, and so on.

Suitable rigid mechanical couplings between the main PCB and one or more extender PCB housings are configured and added enabling (1) to overcome physical vehicle constraints; and (2) to allow factory calibration off the vehicle (step 272). Likewise, suitable signal connections for LO, synch, and control lines between the main and one or more extender PCBs are added (strep 273).

The radar system with the extender array modules is then calibrated in the factory (step 274) and afterwards installed in the target vehicle during (or after) manufacture of the vehicle (step 275). Any necessary minor fine tuning is then performed with the radar installed in the vehicle (step 276).

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. An apparatus for extending the virtual array of an automotive multiple-input multiple-output (MIMO) radar, comprising:
   a main printed circuit board (PCB) incorporating a main RX antenna array and a main TX antenna array;
   one or more extender PCBs, each extender PCB located at a fixed distance from said main PCB and incorporating an extension TX antenna array without any additional RX antenna elements, said one or more extension TX antenna arrays operative to supplement said main TX antenna array to increase the resolution of said virtual array;
   one or more mechanical coupling members, each coupling member operative to rigidly mechanically connect said main PCB to one of said extender PCBs via respective housings such that said one or more extender PCBs remain at said fixed distance within a predetermined tolerance to avoid excessive sidelobes in the virtual array; and
   one or more signal connections, each signal connection operative to couple a local oscillator (LO) signal generated on said main PCB to one of said extender PCBs.

2. The apparatus according to claim 1, further comprising:
   one or more synchronization signal lines between said main PCB and each extender PCB; and
   one or more electrical control signal lines between said main PCB and each extender PCB.

3. The apparatus according to claim 1, wherein said main RX antenna array constitute rows and said main TX antenna array and one or more extension TX arrays constitute columns thereby extending said virtual array horizontally to improve azimuth resolution.

4. The apparatus according to claim 1, wherein said main RX antenna array constitute columns and said main TX antenna array and one or more extension TX arrays constitute rows thereby extending said virtual array vertically to improve elevation resolution.

5. The apparatus according to claim 1, wherein said automotive MIMO radar incorporating said main PCB and one or more extender PCBs rigidly mechanically attached to said main PCB via respective housings is adapted to be calibrated in a factory before installation in a vehicle.

6. The apparatus according to claim 1, wherein said automotive MIMO radar comprises an arrangement of one or more extender PCBs selected from a group consisting of one extender PCB located on one side of said main PCB adapted to increase said virtual array by a factor of 1.5, two extender PCBs with each located on either side of said main PCB adapted to increase said virtual array by a factor of 2, and two extender PCBs with both located on one side of said main PCB adapted to increase said virtual array by a factor of 2.

7. The apparatus according to claim 1, wherein each mechanical coupling member and/or each signal connection is adapted to conform to one or more physical constraints associated with a vehicle.

8. The apparatus according to claim 1, wherein said main RX antenna array, main TX antenna array, and each extension TX antenna array are substantially coplanar and have substantially the same orientation.

9. The apparatus according to claim 1, wherein said one or more signal connections is selected from the group consisting of a wireless radio frequency (RF) connection, an electrical connection, and a waveguide connection.

10. A method of extending the virtual array of an automotive multiple-input multiple-output (MIMO) radar, the method comprising:
   providing a main printed circuit board (PCB) incorporating a main RX antenna array and a main TX antenna array;
   providing one or more extender PCBs, each extender PCB located at a fixed distance from said main PCB and incorporating an extension TX antenna array without any additional RX antenna elements, each extension TX antenna array operative to supplement said main TX antenna array to increase the resolution of said virtual array;
   rigidly mechanically coupling each extender PCB to said main PCB via respective housings such that said one or more extender PCBs remain at said fixed distance within a predetermined tolerance to avoid excessive sidelobes in the virtual array; and coupling a local oscillator (LO) signal generated on said main PCB to each extender PCB via a respective signal connection.

11. The method according to claim 10, further comprising:

one or more synchronization signal lines between said main PCB and each extender PCB; and one or more electrical control signal lines between said main PCB and each extender PCB.

12. The method according to claim 10, wherein said main RX antenna array constitute rows and said main TX antenna array and one or more extension TX arrays constitute columns thereby extending said virtual array horizontally to improve azimuth resolution.

13. The method according to claim 10, wherein said main RX antenna array constitute columns and said main TX antenna array and one or more extension TX arrays constitute rows thereby extending said virtual array vertically to improve elevation resolution.

14. The method according to claim 10, wherein said automotive MIMO radar incorporating said main PCB and one or more extender PCBs rigidly mechanically attached to said main PCB via respective housings is adapted to be calibrated in a factory before installation in a vehicle.

15. The method according to claim 10, wherein said automotive MIMO radar comprises an arrangement of one or more extender PCBs selected from a group consisting of one extender PCB located on one side of said main PCB to increase said virtual array by a factor of 1.5, two extender PCBs with each located on either side of said main PCB to increase said virtual array by a factor of 2, and two extender PCBs with both located on one side of said main PCB to increase said virtual array by a factor of 2.

16. The method according to claim 10, wherein each mechanical coupling member and/or each signal connection is adapted to conform to one or more physical constraints associated with a vehicle.

17. The method according to claim 10, wherein said main RX antenna array, main TX antenna array, and each extension TX antenna array are substantially coplanar and have substantially the same orientation.

18. The apparatus according to claim 10, wherein said signal connections is selected from the group consisting of a wireless radio frequency (RF) connection, an electrical connection, and a waveguide connection.

19. An apparatus for extending the virtual array of an automotive multiple-input multiple-output (MIMO) radar, comprising:

a main printed circuit board (PCB) incorporating a main RX antenna array and a main TX antenna array;

a main housing for said main PCB;

a pair of extender PCBs located on either side of and at a fixed distance from said main PCB, each extender PCB incorporating an extension TX antenna array without any additional RX antenna elements, the pair of extension TX antenna arrays operative to supplement said main TX antenna array to double the resolution of said virtual array;

a pair of extender housings for said pair of extender PCBs;

a mechanical coupling assembly operative to rigidly mechanically connect said main housing to said pair of extender housings such that said pair of extender PCBs remain at said fixed distance within a predetermined tolerance to avoid excessive sidelobes in the virtual array; and signal connections operative to couple a local oscillator (LO) signal generated on said main PCB to said pair of extender PCBs.

\* \* \* \* \*